(12) United States Patent
Soejima

(10) Patent No.: US 7,571,928 B2
(45) Date of Patent: Aug. 11, 2009

(54) AIRBAG COVER, METHOD OF MANUFACTURING THE SAME, AND AIRBAG MODULE

(75) Inventor: Naoki Soejima, Higashiomi (JP)

(73) Assignee: Takata Corporation, Tokyo (JP)

( * ) Notice: Subject to any disclaimer, the term of this patent is extended or adjusted under 35 U.S.C. 154(b) by 195 days.

(21) Appl. No.: 11/094,307

(22) Filed: Mar. 31, 2005

(65) Prior Publication Data
US 2005/0218631 A1 Oct. 6, 2005

(30) Foreign Application Priority Data
Apr. 1, 2004 (JP) ............... 2004-109085

(51) Int. Cl.
*B60R 21/215* (2006.01)
(52) U.S. Cl. ................. 280/728.3; 29/413
(58) Field of Classification Search ............ 280/728, 280/731, 732; 29/413
See application file for complete search history.

(56) References Cited

U.S. PATENT DOCUMENTS

| | | | | |
|---|---|---|---|---|
| 5,060,971 A * | 10/1991 | Nanbu et al. | ............. | 280/728.3 |
| 5,152,548 A * | 10/1992 | Zushi | ............. | 280/728.3 |
| 5,217,244 A | 6/1993 | Bauer | | |
| 5,685,560 A * | 11/1997 | Sugiyama et al. | ............. | 280/731 |
| 5,883,356 A * | 3/1999 | Bauer et al. | ............. | 219/121.62 |
| 5,968,381 A | 10/1999 | Nusshor | | |
| 6,095,552 A * | 8/2000 | Hosoi et al. | ............. | 280/731 |
| 6,106,003 A * | 8/2000 | Rahmstorf et al. | ............. | 280/728.3 |
| 6,224,090 B1 * | 5/2001 | Lutze et al. | ............. | 280/728.3 |
| 6,337,461 B1 | 1/2002 | Yasuda et al. | | |
| 6,435,542 B2 * | 8/2002 | Nakashima et al. | ............. | 280/728.3 |
| 6,502,852 B2 * | 1/2003 | Kassman et al. | ............. | 280/728.3 |
| 6,601,870 B2 * | 8/2003 | Suzuki et al. | ............. | 280/728.3 |
| 6,896,310 B1 * | 5/2005 | Trappe et al. | ............. | 296/70 |
| 7,014,209 B2 * | 3/2006 | Muller et al. | ............. | 280/728.3 |
| 7,029,025 B2 * | 4/2006 | Schwark et al. | ............. | 280/728.3 |
| 7,093,849 B2 * | 8/2006 | Nishijima et al. | ............. | 280/728.3 |
| 7,093,850 B2 * | 8/2006 | Merrifield et al. | ............. | 280/728.3 |
| 2001/0010423 A1 * | 8/2001 | Bauer et al. | ............. | 280/728.3 |
| 2002/0060446 A1 * | 5/2002 | Kassman et al. | ............. | 280/728.3 |
| 2003/0197353 A1 * | 10/2003 | Suzuki et al. | ............. | 280/728.3 |
| 2004/0056455 A1 * | 3/2004 | Nishijima et al. | ............. | 280/728.3 |
| 2004/0075251 A1 * | 4/2004 | Fujii et al. | ............. | 280/728.3 |
| 2005/0116448 A9 * | 6/2005 | Bauer et al. | ............. | 280/728.3 |
| 2005/0127641 A1 * | 6/2005 | Cowelchuk et al. | ............. | 280/728.3 |

FOREIGN PATENT DOCUMENTS

| | | |
|---|---|---|
| DE | 295 11 172 | 3/1996 |
| EP | 583079 A1 * | 2/1994 |
| EP | 1 177 878 | 2/2002 |
| EP | 1 393 994 | 3/2004 |
| GB | 2 276 354 | 9/1994 |
| JP | 2000-95056 | 4/2000 |
| WO | WO01/60664 | 8/2001 |

* cited by examiner

*Primary Examiner*—John Q. Nguyen
*Assistant Examiner*—Timothy Wilhelm
(74) *Attorney, Agent, or Firm*—Manabu Kanesaka

(57) ABSTRACT

An airbag cover for covering a vehicle airbag includes a cover body having a backside, and a groove formed in the backside. The groove has a depth smaller than a thickness of the cover body and a groove formed portion is variable in a thickness direction. The groove is inclined relative to the thickness direction.

13 Claims, 12 Drawing Sheets

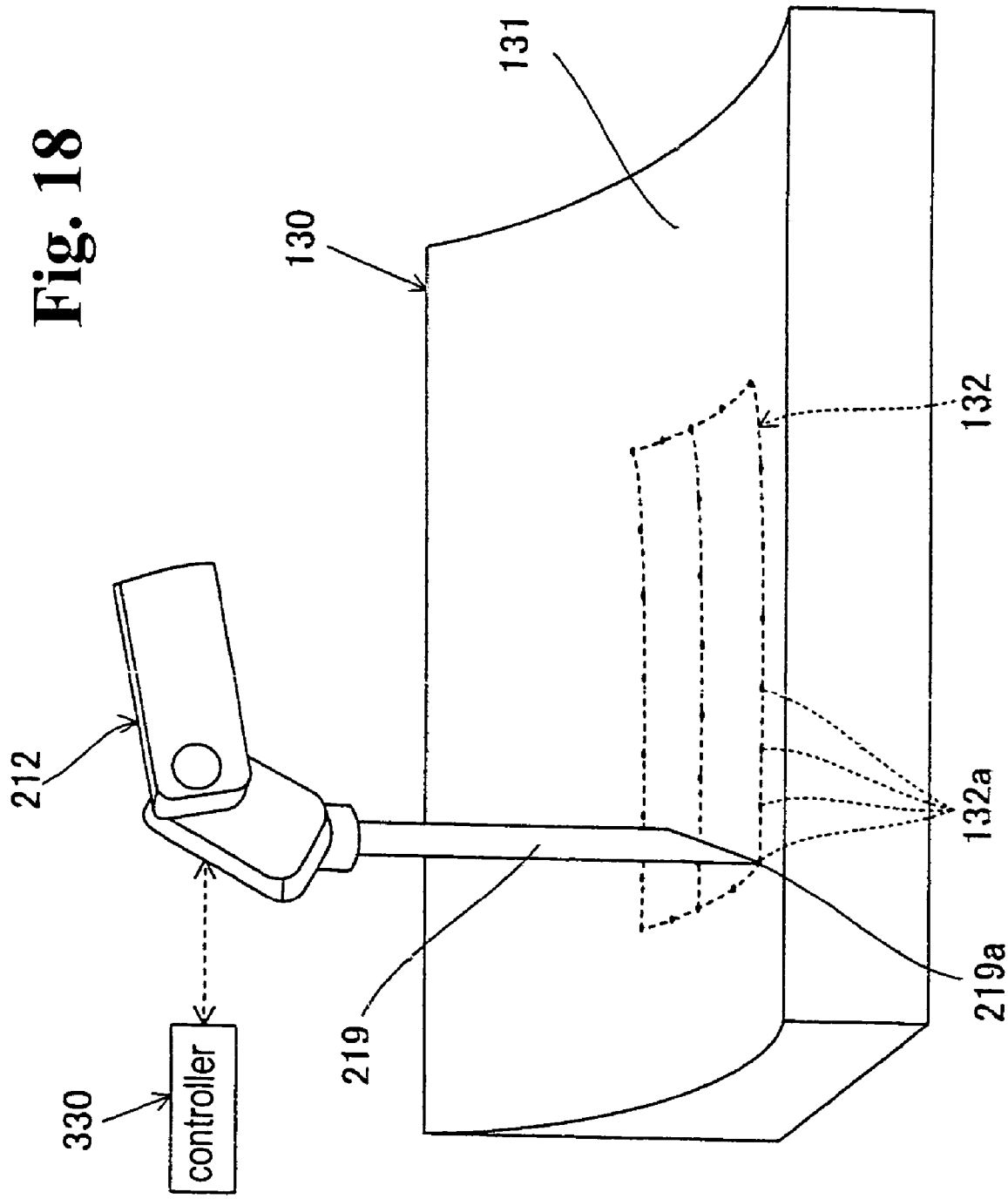

AIRBAG COVER, METHOD OF MANUFACTURING THE SAME, AND AIRBAG MODULE

BACKGROUND OF THE INVENTION AND RELATED ART STATEMENT

The present invention relates to an airbag cover for covering a vehicle airbag, a method of manufacturing the airbag cover, and an airbag module provided with the airbag cover.

In an airbag system installed in a vehicle, an airbag cover is provided for covering a vehicle airbag. The airbag cover has a tear line (a line groove) in an inner wall surface. In the event of a vehicle crash, the airbag cover is torn to open along the tear line, so that the vehicle airbag deploys to an exterior of the airbag cover. A method of forming the tear line in the airbag cover as a post process includes a technique with laser cut (refer to Patent Document 1). Patent Document 1 discloses a method of forming a tear line with laser cut. When the airbag cover of this type is produced, it is necessary to reliably form a tear line with a desired shape in an airbag cover that is torn to open in a desired state.

Patent Document 1: PCT Japanese Translation Patent Publication No. 2001-502996

In view of the problems described above, an object of the present invention is to provide an airbag cover for covering a vehicle airbag, in which it is possible to reliably form a tear line with a desired shape.

Further objects and advantages of the invention will be apparent from the following description of the invention.

SUMMARY OF THE INVENTION

In order to achieve the objects described above, the present invention includes several aspects. A technique of the present invention is applicable to an airbag cover mounted in a various vehicle such as a car, train, motorcycle (saddle-type vehicle), aircraft, and ship and vessel.

According to a first aspect of the present invention, a method of manufacturing of an airbag cover for covering a vehicle airbag mounted on a various vehicle includes machining the airbag cover with an ultrasonic machining device to form a continuous linear groove in the airbag cover. In particular, after the airbag cover is formed, the airbag cover is machined with the ultrasonic machining device to cut the liner groove. The linear groove is a continuous linear groove with a depth within a plate thickness of the airbag cover. The linear groove has a relatively small thickness and is called a tear line. When the vehicle airbag is expanded upon a vehicle crash, the airbag cover is torn to open along the linear groove.

The ultrasonic machining device includes various devices capable of machining a work-piece by transmitting (applying) ultrasonic waves to the work-piece. A typical example is a blade member (ultrasonic machining blade) applied to a work-piece for machining (cutting) the work-piece with ultrasonic waves. Examples other than the blade member include a rod-shape and a plate-shape ultrasonic machining device. A typical example of a machining unit that uses the ultrasonic machining device includes a unit with a structure for controlling an action of the ultrasonic machining blade by a machining robot. That is, a machining action of the ultrasonic machining blade is controlled to form a desired locus.

According to the present invention, the method of manufacturing an airbag cover includes machining the airbag cover with the ultrasonic machining device. In machining the airbag cover with the ultrasonic machining device, the method includes a step of machining the linear groove in such a manner that a remaining thickness of portions of the linear groove can be varied in a thickness direction and the linear groove is inclined in the thickness direction. When the linear groove is formed continuously with the ultrasonic machining device, the linear groove can be inclined in the thickness direction by varying the remaining thickness, i.e. groove formed portion, of the linear groove in the thickness direction.

The linear groove includes a continuous groove extending linearly in the thickness direction along a surface of the airbag cover, and an intermittent (discontinuous) groove extending linearly in the thickness direction along the surface of the airbag cover. The inclined shape includes a linearly inclined groove (like a linear function) and an inclined groove in a curved shape (like a quadratic function). The inclined portion of the linear groove may have a specified angle relative to the plate thickness, or may be formed vertically in the thickness direction. The linear groove is machined so that a cross section becomes a zigzag cut shape, a sealer cut shape, or a step cut shape.

With the method of manufacturing an airbag cover, it is possible to prevent a deformation of the airbag cover during a process of welding another member to the airbag cover as compared with a simple linear groove formed as a groove with a constant depth, thereby improving appearance of the airbag cover. Furthermore, it is possible to increase durability against an external pressure load as compared with a simple linear groove formed as a linear groove with a constant depth.

According to a second aspect of the present invention, in the method of manufacturing an airbag cover in the first aspect, a method of manufacturing an airbag cover includes machining the remaining thickness of the portions of the linear groove to be varied in the thickness direction depending on a load applied to the portions of the linear groove when the vehicle airbag is inflated. With the method of manufacturing an airbag cover, it is possible to adjust strength of the linear groove at the portions, so that timing of tear-open at the portions can be controlled.

In a vehicle crash, a deployment door of the airbag cover is torn to open along the linear groove by the inflation of the vehicle airbag. In an airbag cover in which the deployment door lifts up before completely deployed, it is necessary to tear a portion of the linear groove for lift-up and a portion for deployment of the deployment door at different timings. In the present invention, the airbag cover is machined such that the remaining thickness of the portions of the linear groove is varied in the thickness direction depending on the load applied to the portions of the linear groove during inflation of the vehicle airbag. Accordingly, the deployment door can be deployed after the deployment door completely lifts up.

According to a third aspect of the present invention, in the method of manufacturing an airbag cover in the first or second aspect, a method of manufacturing an airbag cover includes machining the linear groove into a winding shape in a plan view. The winding shape includes a curved winding shape and a zigzag winding shape. The linear groove is machined into a meandering cut shape in a plan view. With the method of manufacturing an airbag cover, it is possible to prevent the deformation of the airbag cover during the process of welding another member to the airbag cover and to increase durability against an external pressure load.

According to a fourth aspect of the present invention, an airbag cover for covering a vehicle airbag includes a linear groove with a depth within a plate thickness of the airbag cover. A remaining thickness of portions of the linear groove is variable and the linear groove is inclined along a thickness direction. With such a structure, it is possible to effectively prevent deformation of the airbag cover during the process of welding another member to the airbag cover as compared with a simple linear groove formed as a groove with a constant depth, thereby improving appearance of the airbag cover. Furthermore, it is possible to increase durability against an external pressure load as compared with a tear line formed as a simple linear groove with a constant depth.

According to a fifth aspect of the present invention, in the airbag cover in the fourth aspect, the remaining thickness of the portions of the linear groove can be varied in the thickness direction depending on a load applied to the portions of the linear groove during inflation of the vehicle airbag. With such a structure of the airbag cover, load strength of the linear groove can be varied at the portions, so that the timing of tear-open at the portions can be controlled.

According to a sixth aspect of the present invention, an airbag module comprises a vehicle airbag, an airbag cover for covering the vehicle airbag, a linear groove with a depth within a plate thickness of the airbag cover, a container (retainer) for accommodating the vehicle airbag, a gas supply device (inflator) for supplying inflation gas such that the vehicle airbag inflates from the container, and an airbag cover that is substantially the same as that in the fifth aspect. The entire airbag module is mounted to a vehicle. The airbag module of the invention can include a member for mounting the airbag cover, or a panel called an instrument panel.

In the airbag module, in a vehicle crash, the vehicle airbag inflates by inflation gas supplied from the gas supply device, so that the airbag cover is torn to open along a first linear groove of the linear groove to be lifted up toward an occupant protection region and then torn to open along a second linear groove of the linear groove to be deployed into the occupant protection region. With the structure of the airbag module, the airbag cover is lifted up before the deployment door is deployed. Accordingly, it is possible to control reliably so that the entire deployment door is lifted up by the tear-open of the first linear groove and then the deployment door deploys by the tear-open of the second linear groove, thereby deploying the vehicle airbag in the occupant protection region.

According to the invention, in manufacturing the airbag cover having the linear groove formed by the ultrasonic machining device, the tear line with a desired shape that is torn to open in a desired state can be formed in the airbag cover with various machining methods for the linear groove.

BRIEF DESCRIPTION OF THE DRAWINGS

FIG. 18 is a schematic diagram showing a process of step S113 in FIG. 16.

DETAILED DESCRIPTION OF PREFERRED EMBODIMENTS

Hereunder, embodiments of the present invention will be explained with reference to the accompanying drawings. The embodiment relates to a technique of forming a tear line 102 in a back surface 101 of an airbag cover 100 for covering a vehicle airbag by ultrasonic machining.

Figure 1:
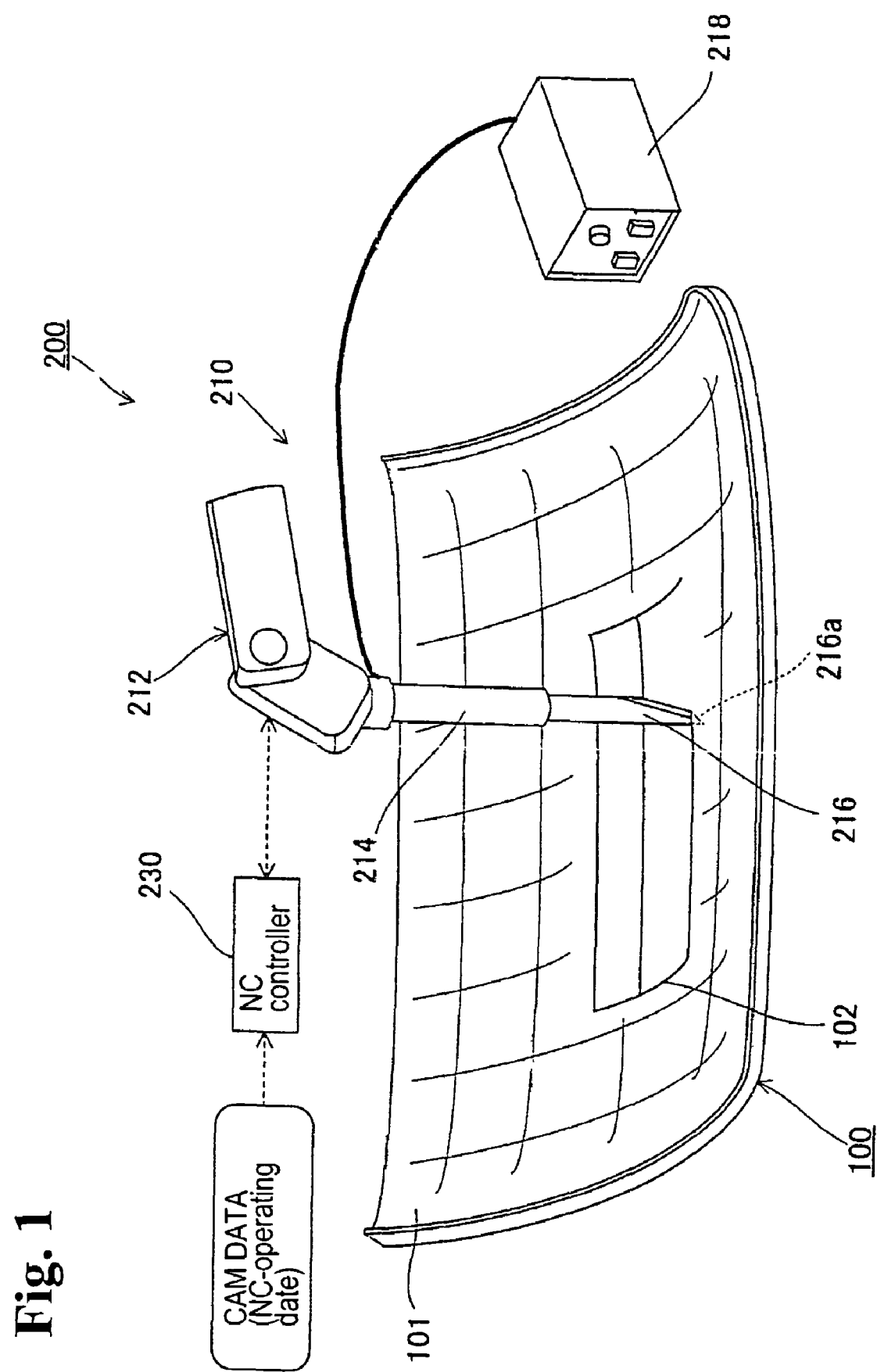
FIG. 1 is a view showing an airbag cover and an ultrasonic machining unit for machining the airbag cover in a process of ultrasonic machining according to an embodiment of the present invention.

Referring to FIG. 1, a structure of the airbag cover 100 and an ultrasonic machining unit 200 will be described. FIG. 1 shows the structure of the airbag cover 100 according to the embodiment and the ultrasonic machining unit 200 for machining the airbag cover 100, showing ultrasonic machining of the airbag cover 100 with the ultrasonic machining unit 200.

The airbag cover 100 in FIG. 1 has a three-dimensional (solid) plate-like structure made of a resin material such as polypropylene (PP) or an olefin elastomer (TPO) material. The back surface 101 of the airbag cover 100 is opposite to a front surface facing an occupant when the airbag cover 100 is mounted. The tear line 102 is a line with a reduced thickness for allowing the airbag cover 100 to be torn to open at the inflation of a vehicle airbag (a vehicle airbag 150; described later). In this embodiment, the tear line 102 is a linear groove in the back surface 101 of the airbag cover 100, and corresponds to a linear groove of the invention.

As shown in FIG. 1, the ultrasonic machining unit 200 is formed of a driving section 210 and an NC controller 230. The driving section 210 includes a drive arm 212, an ultrasonic vibrator 214, an ultrasonic machining blade 216, an ultrasonic wave oscillator 218, etc. The ultrasonic machining unit 200 also includes displacement gauges 221 and 222 and an image check camera 223 (described later). The ultrasonic machining unit 200 corresponds to an ultrasonic machining device of the invention.

The drive arm 212 is a part of a machining robot and controlled according to a signal input from the NC controller 230 for adjusting a position, angle, and travel locus of an edge 216a of an ultrasonic machining blade 216. The ultrasonic vibrator 214 has a function of transmitting ultrasonic waves oscillated by the ultrasonic wave oscillator 218 to the ultrasonic machining blade 216.

The ultrasonic machining blade 216 is used to form the tear line 102 in the back surface 101 of the airbag cover 100. In this embodiment, a machining blade with a width of, for example, 1 mm can be used. The ultrasonic machining blade 216 may be another member for machining a work-piece by transmitting (applying) ultrasonic waves to the work-piece such as rod-like or plate-like members.

The ultrasonic wave oscillator 218 has a function of oscillating ultrasonic waves with a specified frequency. In this embodiment, an oscillator capable of oscillating an ultrasonic wave with a frequency of, for example, 22 kHz can be used.

The NC controller 230 stores machining data to form the tear line 102 in the back surface 101 of the airbag cover 100, and has a function of inputting, operating, and outputting machining data for the airbag cover 100.

Figure 2:
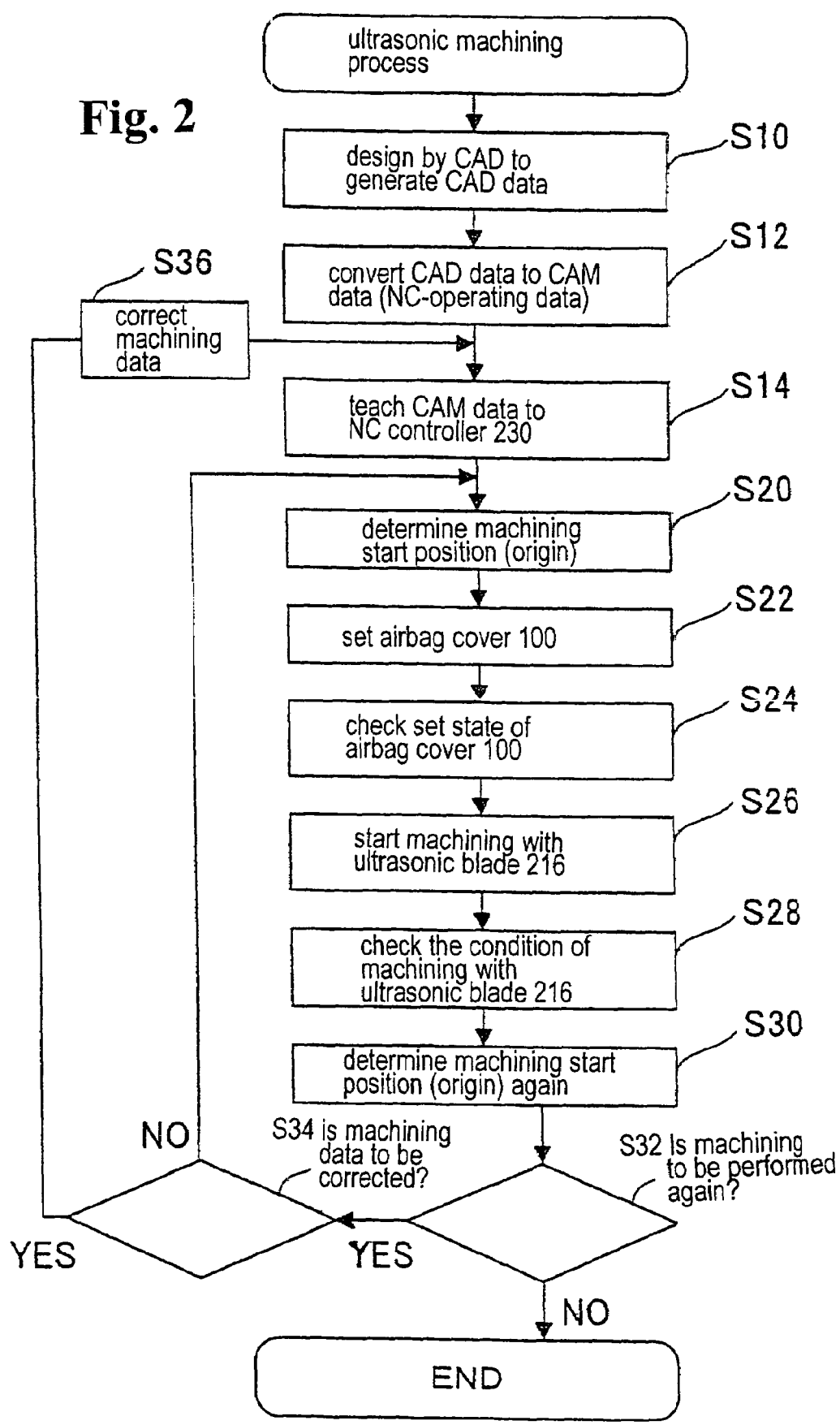
FIG. 2 is a flowchart showing the process of ultrasonic machining with the ultrasonic machining unit according to the embodiment of the present invention.
Figure 3:
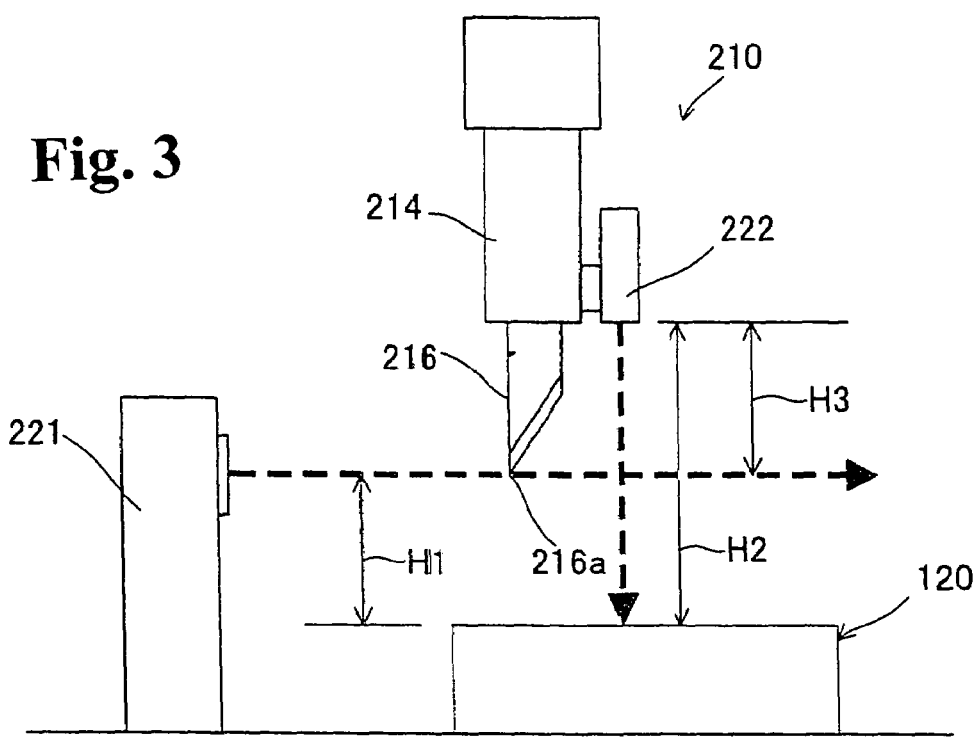
FIG. 3 is a schematic view showing a process of steps S20 to S32 in FIG. 2.
Figure 4:
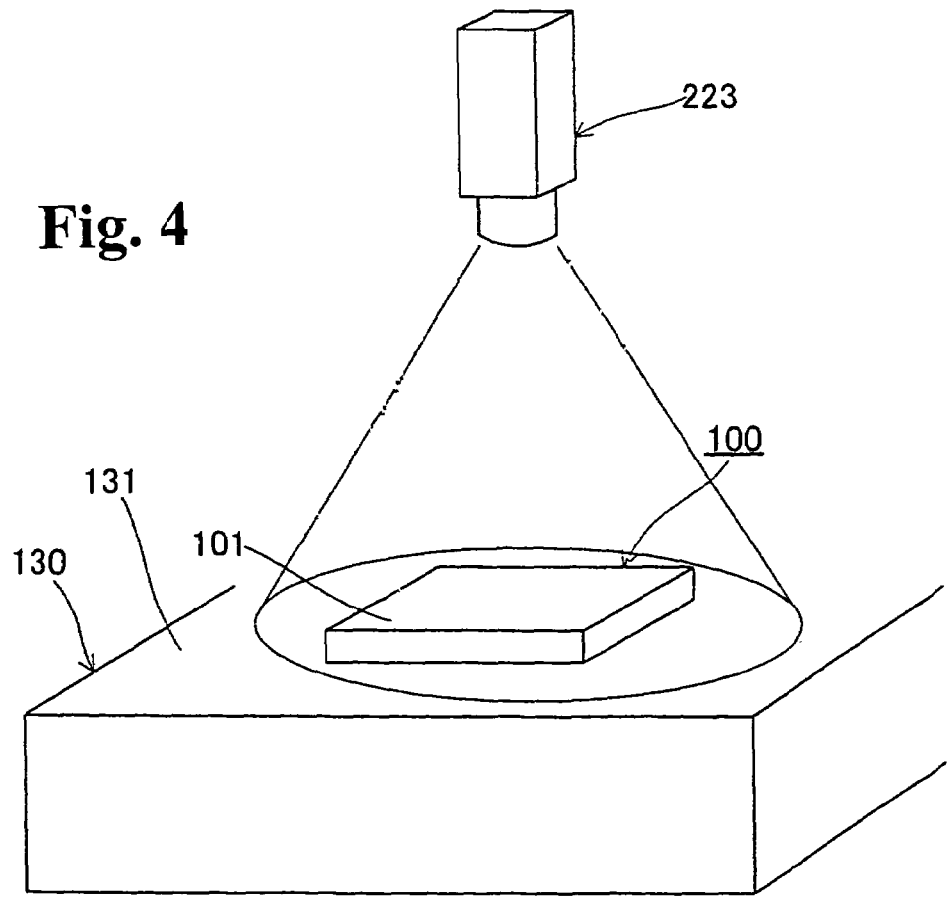
FIG. 4 is a schematic view showing a process of step S24 in FIG. 2.
Figure 5:
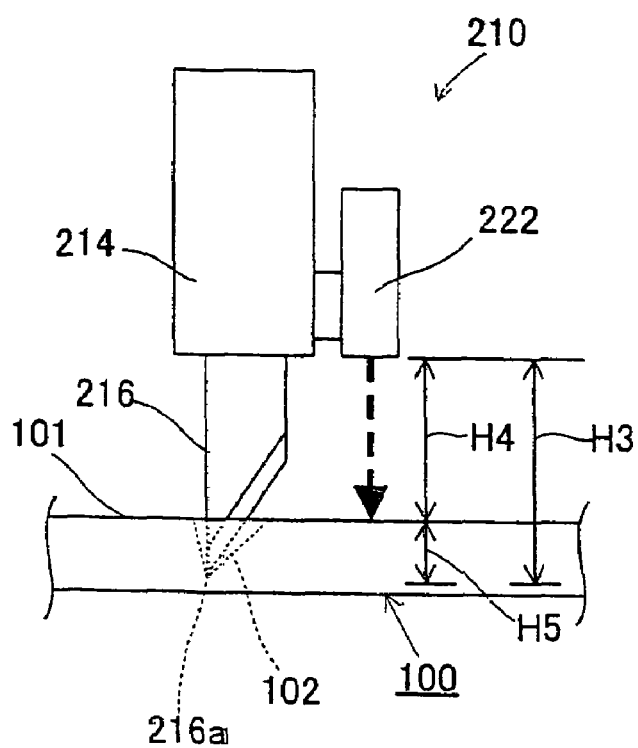
FIG. 5 is a schematic view showing a process of step S30 in FIG. 2.
Figure 6:
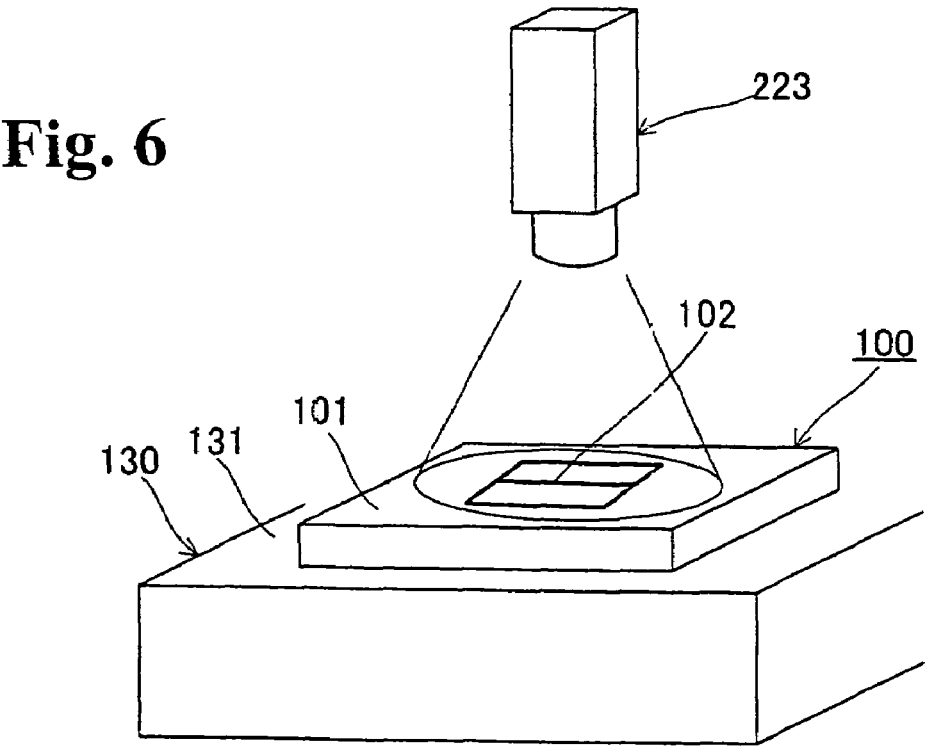
FIG. 6 is a schematic view showing a process of step S30 in FIG. 2.

Referring to FIGS. 2 to 6, a process of machining the tear line 102 in the airbag cover 100 with the ultrasonic machining unit 200 will be described next. FIG. 2 is a flowchart showing the process of ultrasonic machining with the ultrasonic machining unit 200 according to the embodiment of the present invention. FIG. 3 is a schematic view showing a process of steps S20 to S32 in FIG. 2. FIG. 4 is a schematic view showing a process of step S24 in FIG. 2. FIGS. 5 and 6 are schematic views showing a process of step S30 in FIG. 2.

In a method of manufacturing an airbag cover according to the embodiment of the invention, the machining process is divided into a data processing process of processing machining data before machining and a machining process of machining with the ultrasonic machining unit.

[Data Processing Process]

In the data processing process, machining data is obtained before actually machining the airbag cover 100. The data processing process includes steps S10 to S14, as shown in FIG. 2.

In step S10, CAD data (machining data) is produced by computer-aided design (CAD) according to design information on the airbag cover 100. For example, design information stored in a computer is extracted to a graphic display unit and then designing is performed while viewing the screen.

In step S12, the CAD data obtained in step S10 is converted by computer-aided manufacturing (CAM) to create CAM data. The CAM data serves as machining data (NC-operating data) in the NC controller 230.

In step S14, the CAM data (machining data) obtained in step S10 is taken into the NC controller 230, wherein the CAM data is taught to the NC controller 230. In this embodiment, the CAM data taken into the NC controller 230 can be corrected by the NC controller 230 according to actual machining results.

Upon completion of the data processing, the airbag cover 100 is actually machined. The machining process includes steps S20 to S30 shown in FIG. 2.

In step S20, the machining start position (origin) of the ultrasonic machining blade 216 is determined before machining. For example, the laser displacement gauges 221 and 222 are used. The displacement gauge 221 is provided to the base, while the displacement gauge 222 is provided to the ultrasonic machining blade 216 of the driving section 210. With such a structure, as shown in FIG. 3, a height H1 (distance) from a top of a reference block 120 to the edge 216a of the ultrasonic machining blade 216 is determined by the displacement gauge 221. Also, a height H2 (distance) from the top of the reference block 120 to the displacement gauge 222 is determined by the displacement gauge 222. Then, a height H3 from the displacement gauge 222 to the edge 216a of the ultrasonic machining blade 216 is determined (derived) by calculating a difference (H2–H1) between the determined heights H1 and H2. Accordingly, the machining start position (origin) of the ultrasonic machining blade 216 is determined.

In step S20, the number of points for determining the height H1 by the displacement gauge 221 and the height H2 by the displacement gauge 222 can be set as appropriate in consideration of a shape of the airbag cover 100. For example, it is preferable to increase the number of points for determining the heights H1 and H2 as a shape of the airbag cover 100 becomes complicated.

In step S22, the airbag cover 100 is placed on an airbag-cover receiver jig (an airbag-cover receiver jig 130 in FIG. 4). An airbag-cover receiving surface 131 of the airbag-cover receiver jig 130 has a shape corresponding to a surface of the airbag cover 100. The airbag-cover receiver jig 130 mounts a suction mechanism by air (not shown). The suction mechanism operates to allow the airbag cover 100 to be held on the airbag-cover receiving surface 131. The suction mechanism of the airbag-cover receiver jig 130 includes a suction-pressure detection device (not shown) capable of detecting the suction pressure.

In step S24, a set state of the airbag cover 100 is checked, wherein a state of adhesion between the airbag cover 100 and the airbag-cover receiver jig 130 is checked by the suction pressure of the suction mechanism of the airbag-cover receiver jig 130. A displacement of the airbag cover 100 is checked by the image check camera 223, as shown in FIG. 4. Accordingly, an operator can check the set state of the airbag cover 100.

In step S26, actual machining with the ultrasonic machining blade 216 is started. At that time, the ultrasonic wave oscillator 218 oscillates an ultrasonic wave with a frequency of, for example, 22 kHz and transfers the ultrasonic wave to the ultrasonic machining blade 216 via the ultrasonic vibrator 214. The drive arm 212 is controlled according to an input signal from the NC controller 230 for adjusting a position of the edge 216a of the ultrasonic machining blade 216, so that a machining action of the ultrasonic machining blade 216 forms a desired locus. A machining speed of the ultrasonic machining blade 216 can be, for example, 30 mm/s. The machining speed is 1.5 times faster than 20 mm/s of laser machining, so that it is effective in increasing production efficiency of the airbag cover 100.

The conditions of machining such as the frequency of the ultrasonic wave oscillated by the ultrasonic wave oscillator 218 and the machining speed of the ultrasonic machining blade 216 can be set as appropriate depending on the conditions of a work-piece such as a material and plate thickness of the airbag cover.

In step S28, the state of machining with the ultrasonic machining blade 216 is checked at (during) the machining with the ultrasonic machining blade 216. As shown in FIG. 5, a height H4 from the back surface 101 of the airbag cover 100 to the displacement gauge 222 is determined by the displacement gauge 222.

A depth H5 of machining (the depth of cutting) of the tear line 102 can be obtained (derived) by calculating a difference (H3–H4) between the height H3 (the height from the displacement gauge 222 to the edge 216a of the ultrasonic machining blade 216) and the height H4 determined in advance in step S20. As described above, in this embodiment, the depth H5 of machining of the tear line 102 can be estimated indirectly from other determination information without directly determining the depth H5 of machining of the tear line 102.

A remaining thickness (a remaining thickness in the invention) of the airbag cover 100 at a portion of the tear line 102 can be checked according to the depth H5 and the data in the NC controller 230. Thus, the airbag cover 100 having the continuous tear line 102 with a desired machining depth can be manufactured. The machining depth H5 of the tear line 102 is sometimes difficult to determine directly when the shape of the airbag cover or the work-piece is complicated three-dimensionally. In this embodiment, it is particularly effective in machining the tear line 102 with a desired depth in the three-dimensional airbag cover, since the information on the machining depth H5 of the tear line 102 is continuously acquired during machining to reliably determine the machining depth H5.

In step S28, the number of points for determining the height H4 by the displacement gauge 222 can be set as appropriate in consideration of the shape of the airbag cover 100. For example, it is preferable to increase the number of points for determining the height H4 as the shape of the airbag cover 100 becomes complicated. Also, as shown in FIG. 6, the machining locus of the tear line 102 is checked with the image check camera 223.

In step S30, the machining start position (origin) of the ultrasonic machining blade 216 is checked again by the operation similar to that in step S20. After step S30, it is determined in step S32 whether to perform the machining of another airbag cover. When the machining is not performed (NO in step S32), the machining process is completed. On the other hand, when the machining is to be performed (YES in step S32), it is determined in step S34 whether to correct the machining data according to actual machining results. When the machining data is to be corrected (YES in step S34), the machining data is corrected in step S36 and then the procedure returns to step S14. Conversely, when the machining data is not to be corrected (NO in step S34), the process returns to step S20.

Figure 11:
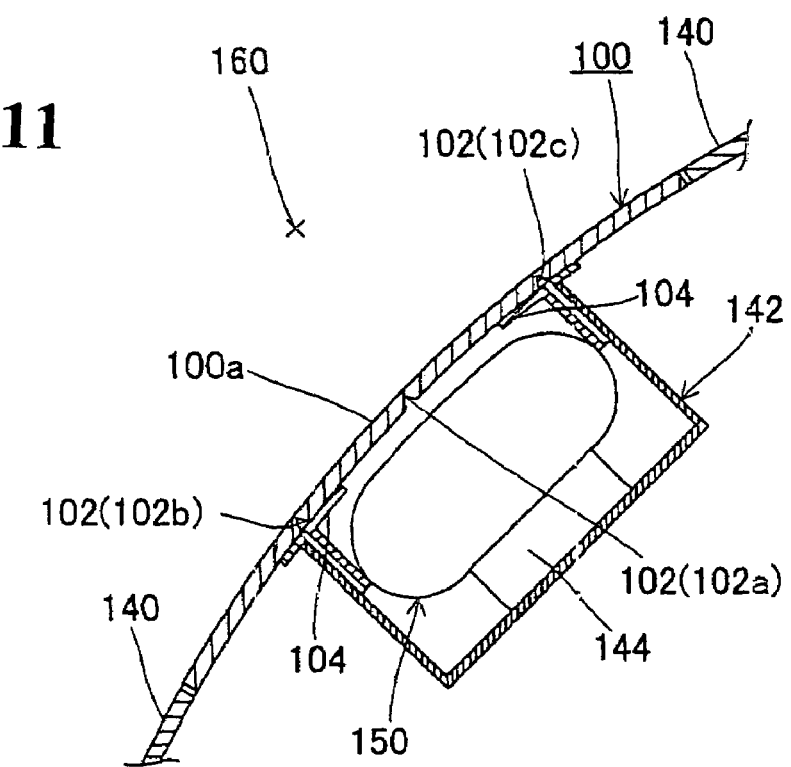
FIG. 11 is a cross sectional view showing an airbag module with the airbag cover in a state before a vehicle airbag is inflated.

The airbag cover 100 manufactured by the manufacturing method can be applied to a vehicle as shown in FIG. 11. FIG. 11 is a cross sectional view showing an airbag module with the airbag cover 100 in a state before the vehicle airbag 150 is inflated. As shown in FIG. 11, the airbag module according to the embodiment includes the airbag cover 100, an instrument panel 140 on which the airbag cover 100 is mounted, the vehicle airbag 150 (corresponding to the vehicle airbag in the invention), a container (retainer) 142 in which the folded vehicle airbag 150 is accommodated, and a gas supply device (inflator) 144 accommodated in the container 142 for supplying inflation gas into the vehicle airbag 150. The airbag module corresponds to the airbag module of the invention. FIG. 11 also shows the tear line 102, a tear line 102a extending in the center of the airbag cover 100, and tear lines 102b and 102c extending on both sides of the tear line 102a and substantially in parallel to the tear line 102a.

Figure 7:
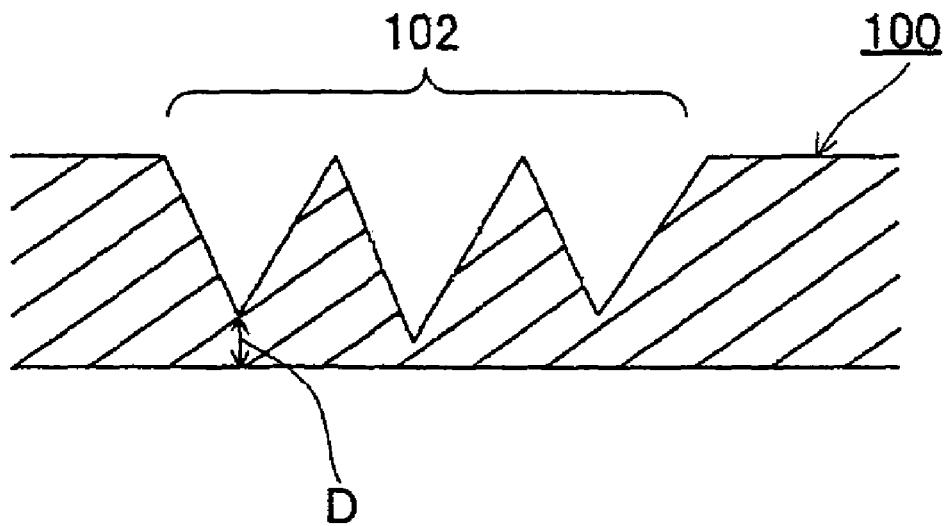
FIG. 7 is a cross-sectional view of a tear line formed in the airbag cover according to the embodiment of the present invention.
Figure 8:
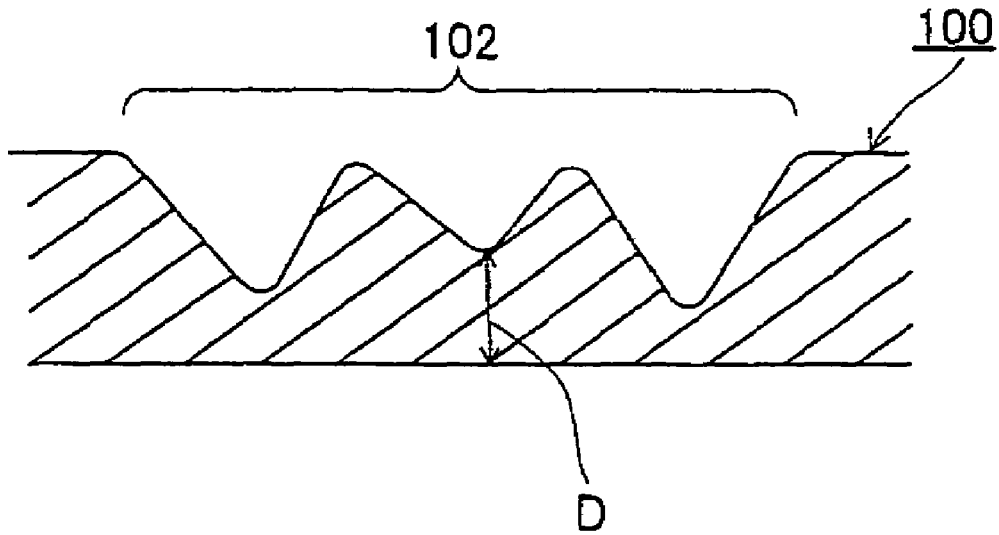
FIG. 8 is a cross-sectional view of a tear line formed in the airbag cover according to the embodiment of the present invention.
Figure 9:
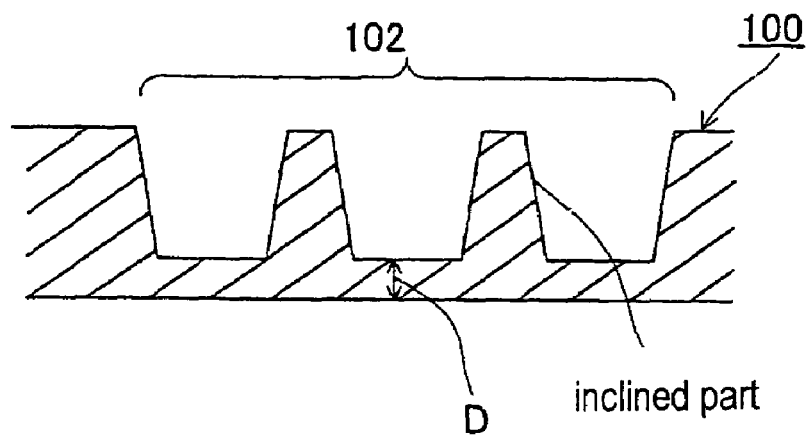
FIG. 9 is a cross-sectional view of a tear line formed in the airbag cover according to the embodiment of the present invention.
Figure 10:
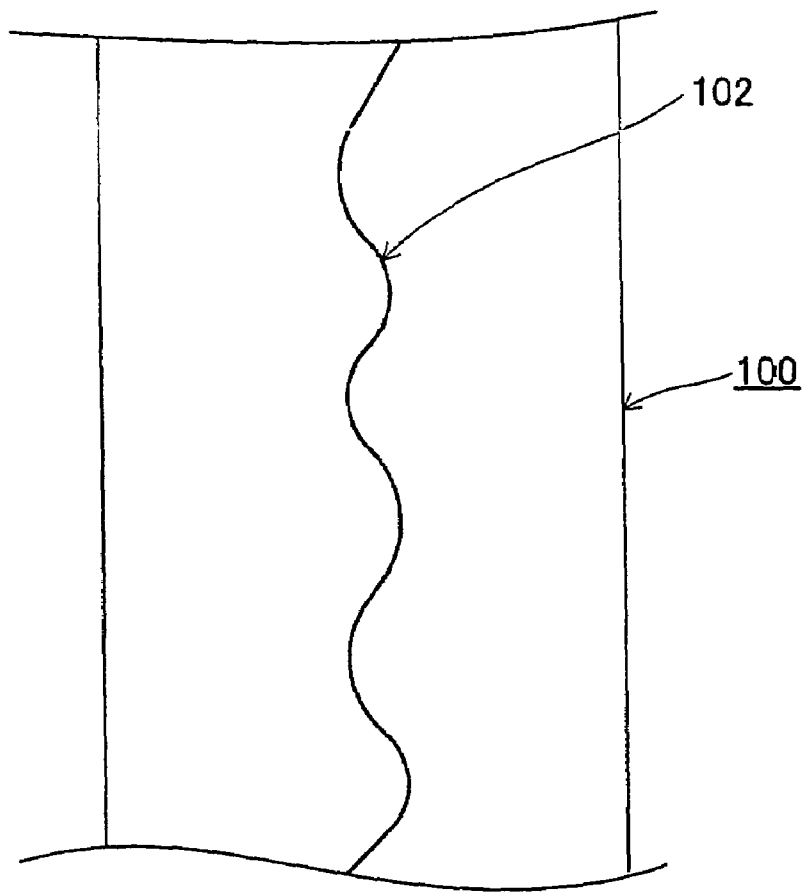
FIG. 10 is a plan view of the tear line formed in the airbag cover according to the embodiment of the present invention.

Referring to FIGS. 7 to 10, the machining of the airbag cover 100 in step S26 of the ultrasonic machining process will be described. FIGS. 7 to 9 are cross-sectional views of the tear line 102 formed in the airbag cover 100 according to the embodiment of the present invention. FIG. 10 a plan view of the tear line 102 formed in the airbag cover 100 according to the embodiment of the present invention.

In this embodiment, the position of the edge 216a of the ultrasonic machining blade 216 is adjusted so that the cross section of the tear line 102 becomes a zigzag cut shape (linear shape) as shown in FIG. 7, a sealer cut shape (curved shape) as shown in FIG. 8, or a step cut shape as shown in FIG. 9. A plan view of the tear line 102 becomes a meandering cut shape (winding shape) as shown in FIG. 10. An inclined part extending along the thickness in the step cut shape shown in FIG. 9 may be formed at a specific inclination or substantially vertically relative to the thickness direction.

The remaining thickness of the portions of the continuous tear line 102 can be varied in the thickness direction and inclined in the thickness direction. The tear line 102 can be curved in a plan view. The tear line 102 with such a structure is more effective in preventing the deformation of the airbag cover during the process of welding another member to the machined airbag cover as compared with a simple tear line formed as a linear groove with a constant depth, thereby improving appearance of the airbag cover. Furthermore, it is possible to effectively increase durability against an external pressure loads as compared with a simple tear line formed as a linear groove with a constant depth.

In this embodiment, in step S26, the cross section of the tear line 102, or the remaining thickness D of the airbag cover 100 at the tear line 102, can be varied depending on the load applied to the portions of the tear line 102 at the inflation of the vehicle airbag 150. More specifically, the airbag cover 100 is constructed such that the remaining thickness D of the tear line 102a to which a relatively high load is applied is larger than the thickness D of the tear lines 102b and 102c to which a relatively low load is applied. In other words, in this embodiment, the thicknesses of the tear lines 102a, 102b, and 102c are set so that the tear lines 102b and 102c are torn to open earlier than the tear line 102a at the inflation of the vehicle airbag 150. In step S28, the remaining thicknesses along the thickness of the portions of the linear groove can be varied depending on the load applied to the portions of the linear groove at the inflation of the vehicle airbag.

Figure 12:
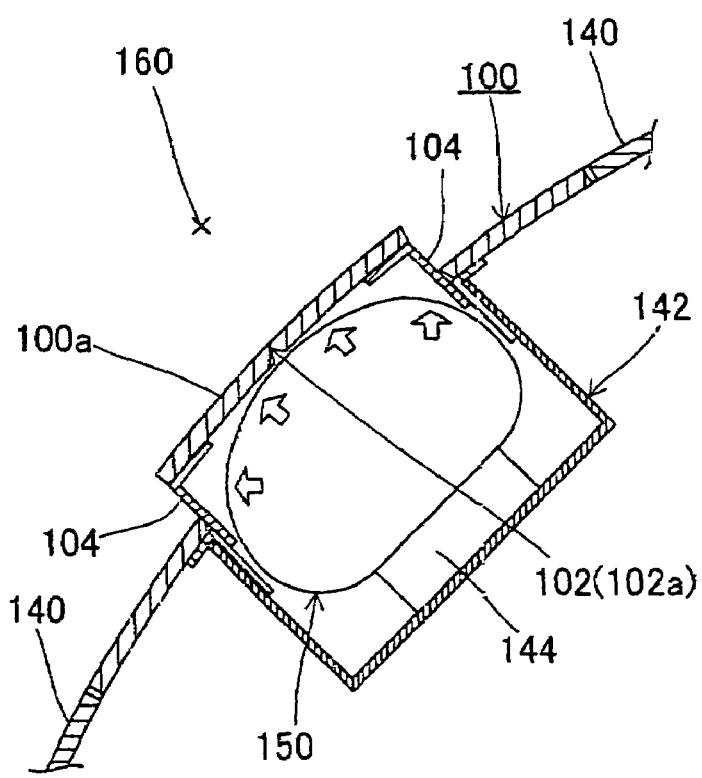
FIG. 12 is a cross-sectional view showing the airbag module with the airbag cover when the vehicle airbag is inflated.
Figure 13:
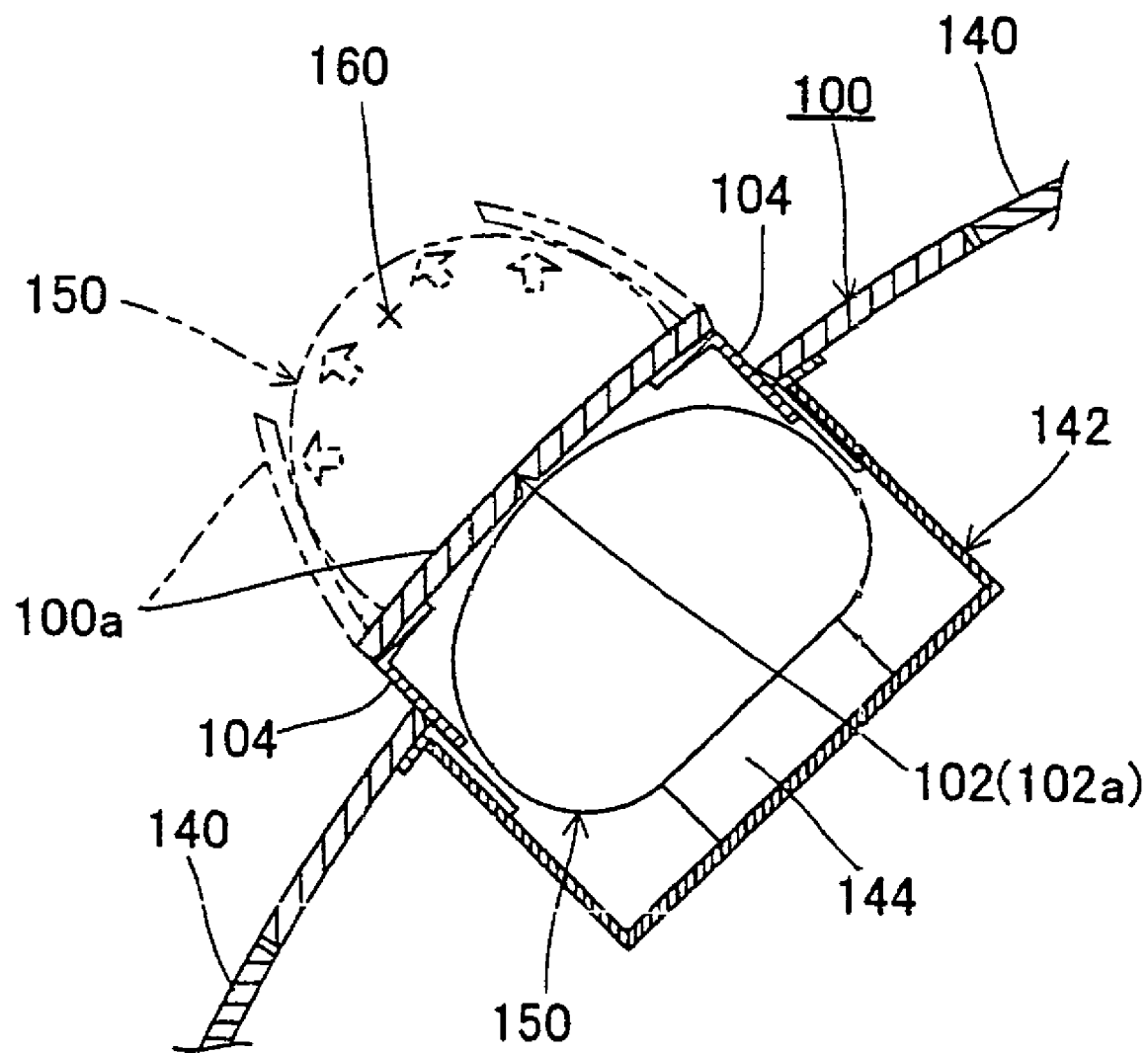
FIG. 13 is a cross-sectional view showing the airbag module with the airbag cover when the vehicle airbag is inflated.

The airbag cover 100 with such a structure acts as shown in FIGS. 12 and 13 during the process of the inflation of the vehicle airbag 150. FIGS. 12 and 13 are cross-sectional view showing the airbag module with the airbag cover 100 when the vehicle airbag 150 is inflated. In a front crash of a vehicle, the gas supply device 144 is activated to deploy the vehicle airbag 150 by inflation gas supplied from the gas supply device 144.

As shown in FIG. 12, the tear lines 102b and 102c (corresponding to a first linear groove of the invention) of the airbag cover 100 on both sides of the tear line 102a are first torn to open when the vehicle airbag 150 is inflated. Specifically, it is constructed such that the remaining thickness D of the tear line 102a is larger than the remaining thicknesses D of the tear lines 102b and 102c. Accordingly, the tear lines 102b and 102c can be torn to open earlier than the tear line 102a even when a relatively high load is applied to the tear line 102a from the vehicle airbag 150. Thus, a deployment door 100a of the airbag cover 100 protrudes along with an inner part 104 toward an occupant protection region 160 (an occupant protection region of the invention) in front of an occupant. The action of the deployment door 100a of the airbag cover 100 is called lift-up.

When the vehicle airbag 150 is further inflated, the airbag cover 100 is then torn to open along the tear line 102a (corresponding to a second linear groove of the invention), as indicated by a phantom line in FIG. 13. A pair of the deployment doors 10a deploys into a double open state (like a gatefold door). Accordingly, the vehicle airbag 150 deploys into the occupant protection region 160. In this way, the vehicle airbag 150 deploys through the deployed deployment door 100a to the exterior of the airbag cover 100 while protruding into the occupant protection region 160. The airbag cover 100 is torn to open along the tear line 102a after the deployment door 100a is once lifted up, so that the vehicle airbag 150 is inflated more reliably into the occupant protection region 160.

As described above, in the embodiment, the tear line 102 with a desired shape that is torn to open in a desired way can reliably be formed in the airbag cover 100. In the embodiment, it is possible to prevent the deformation of the airbag cover during the process of welding another member to the machined airbag cover due to the cross sections and the plan view shape of the tear line 102, thereby improving appearance of the airbag cover.

In particular, the remaining thickness D of the tear line 102a to which a relatively high load is applied is larger than the remaining thicknesses D of the tear lines 102b and 102c to which a relatively low load is applied. Accordingly, the load on the tear line 102 can be varied depending on the portions, so that the timing of tear-open at the portions can be controlled. Accordingly, it is easy to lift up the deployment door 100a of the airbag cover 100 in the front crash of a vehicle.

The invention is not limited to the embodiment described above, and various modifications are possible. For example, the following modifications can be made.

In the above embodiment, the cross section of the tear line 102 is a zigzag cut shape (linear shape), a sealer cut shape (curved shape), or a step cut shape. The plan view of the tear line 102 is a meandering cut shape. The tear line 102 may have any other shapes with an inclined cross section. The airbag cover 100 is constructed such that at least the remaining thickness of the tear line can be varied in the thickness direction and the linear groove is inclined along the thickness as compared with a simple linear groove with a constant depth. The structure is effective in preventing the deformation of the airbag cover during the process of welding another member to the machined airbag cover, and in increasing durability to withstand external pressure loads.

The ultrasonic machining unit may have an another structure to form the tear line 102 in an airbag cover in place of the ultrasonic machining unit 200 according to the embodiment. Referring to FIGS. 14 to 18, a structure of an ultrasonic machining unit 300 according to another embodiment, and a method of ultrasonic machining using the ultrasonic machining unit 300 will be described. In FIGS. 14 to 18, the same components as those in FIGS. 1 to 13 are given the same reference numerals.

Figure 14:
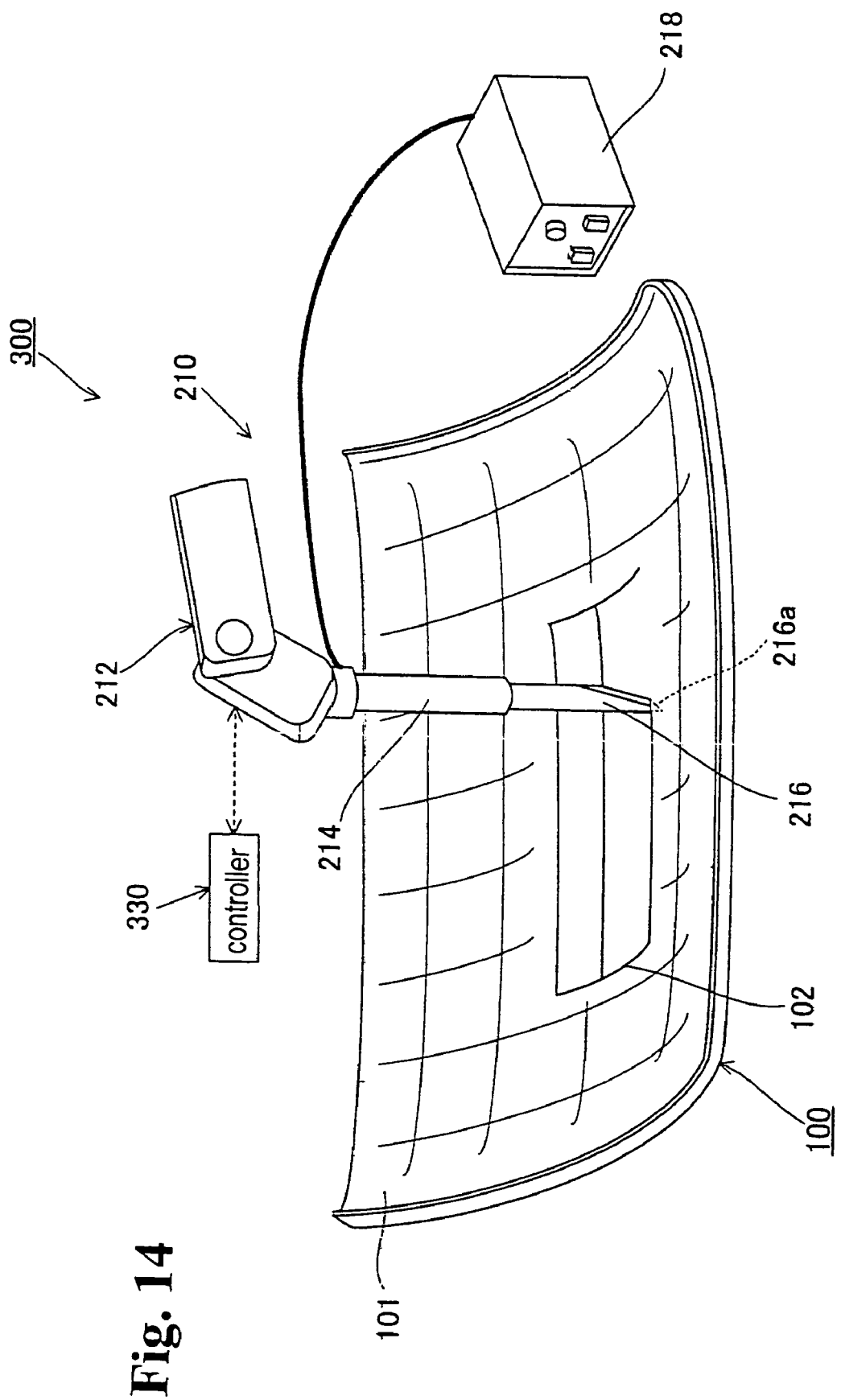
FIG. 14 is a view showing an airbag cover and an ultrasonic machining unit for machining the airbag cover in a process of ultrasonic machining according to another embodiment of the present invention.

The ultrasonic machining unit 300 shown in FIG. 14, i.e., an ultrasonic machining device, stores machining data for the ultrasonic machining blade 216. The machining data includes the position, angle, travel locus, etc. of the drive arm 212 during ultrasonic machining obtained in a copying-teaching process (described later) and data on cut patterns.

Figure 15:
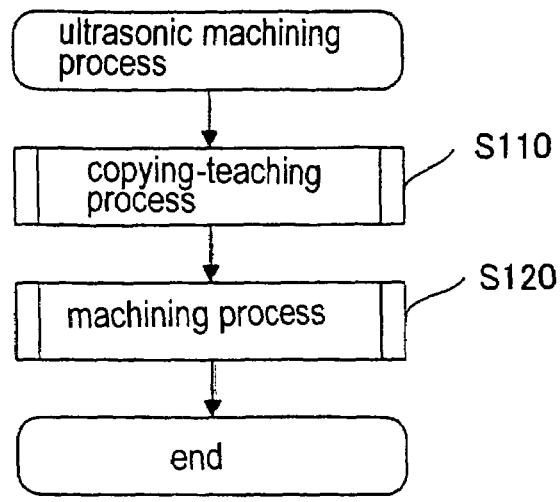
FIG. 15 is a flowchart showing the process of ultrasonic machining with the ultrasonic machining unit.
Figure 16:
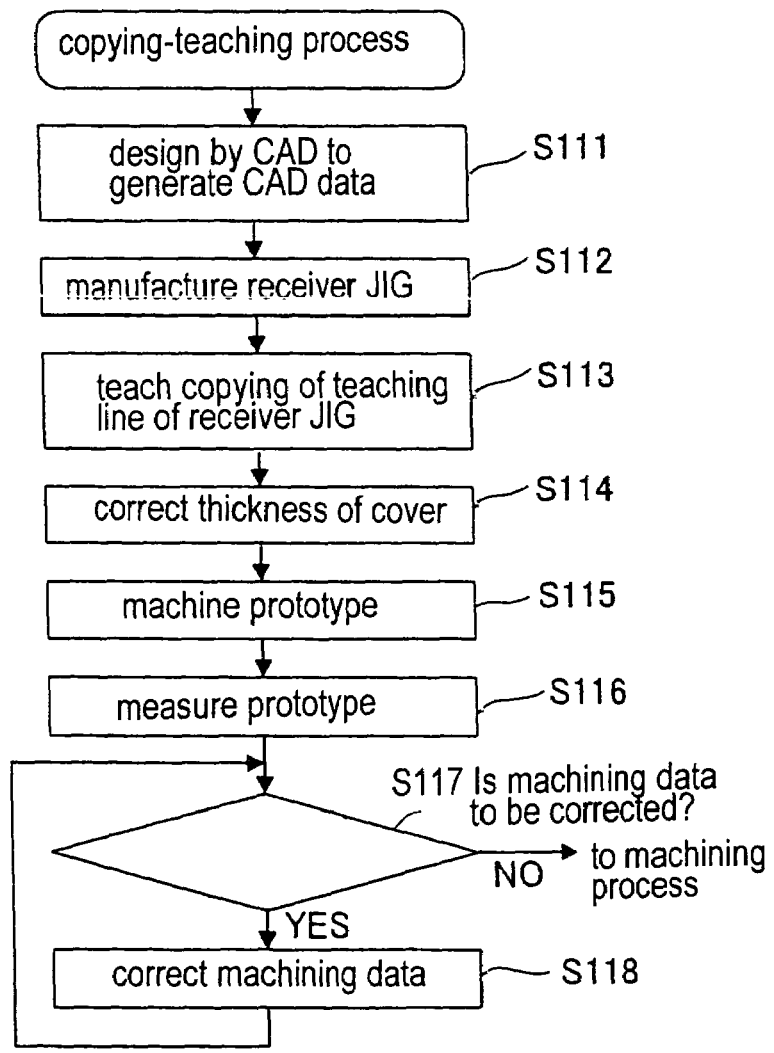
FIG. 16 is a flowchart showing a copying-teaching process in FIG. 15.
Figure 17:
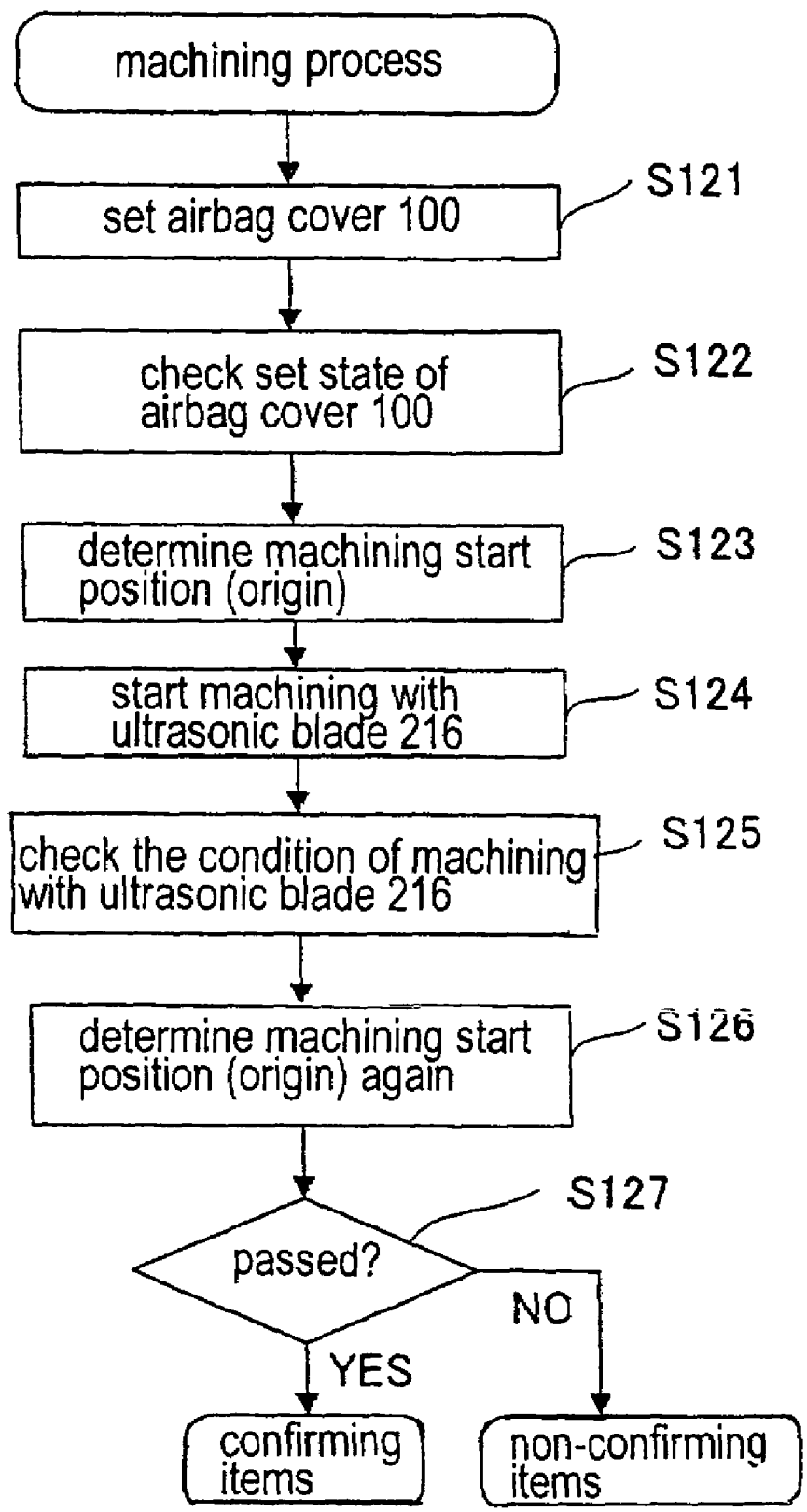
FIG. 17 is a flowchart showing a machining process in FIG. 15.

FIG. 15 shows a flowchart of the ultrasonic, machining process by the ultrasonic machining unit 300. As shown in FIG. 15, the ultrasonic machining process of the airbag cover 100 is divided into the copying-teaching process (step S110) for processing machining data before machining, and a machining process (step S120) for actually machining with the ultrasonic machining unit. In the copying-teaching process, steps S111 to S118 in FIG. 16 are performed in sequence. In the machining process, steps S121 to S127 in FIG. 17 are performed.

[Copying-Teaching Process]

The copying-teaching process is a process for obtaining data on the position, angle, travel locus, etc. of the ultrasonic machining blade 216 as machining data during ultrasonic machining before the actual ultrasonic machining (tear line machining) of the airbag cover 100.

FIG. 16 is a flowchart of the copying-teaching process in FIG. 15. As shown in FIG. 16, in the copying-teaching process, in step S111, CAD data (machining data) is first produced by computer-aided design (CAD) according to design information on the airbag cover 100. For example, design information stored in a computer is extracted to a graphic display unit and designing is performed while viewing the screen. In step S112, the airbag-cover receiver jig 130 of a shape suitable for ultrasonic machining (tear line machining) of the airbag cover 100 is manufactured according to the CAD data obtained in step S111.

FIG. 18 is a schematic diagram showing a process of step S113 in FIG. 16. As shown in FIG. 18, according to this embodiment, when step S113 in FIG. 16 is performed, a teaching line 132 is formed in the airbag-cover receiving surface 131 of the airbag-cover receiver jig 130. The teaching line 132 is a machining locus corresponding to the tear line 102.

In step S113 in FIG. 16, a controller 330 is taught copying data to acquire machining data for the ultrasonic machining blade 216. More specifically, a member-to-be-taught 219 follows the teaching line 132 on the airbag-cover receiving surface 131, so that the controller 330 is given copying data on the position, angle, travel locus, etc. of the ultrasonic machining blade 216 during machining. The member-to-be-taught 219 is an imitation of the ultrasonic machining blade 216, and is mounted to the drive arm 212 during copying teaching in place of the ultrasonic machining blade 216. The member-to-be-taught 219 is moved such that the tip 219a of the member-to-be-taught 219 holds multiple teaching hold points 132a on the teaching line 132 in sequence. Accordingly, the controller 330 is given copying teaching, so that the copying data can be stored automatically in the controller 330. The copying teaching may be made by continuously sliding the tip of the member-to-be-taught 219 on the teaching line 132.

Step S113 is a step for acquiring (deriving) copying data in such a way that the member-to-be-taught 219 follows the teaching line 132 on the airbag-cover receiving surface 131 of the airbag-cover receiver jig 130.

The copying data acquired by the copying-teaching in step S113 is changed to correction data in which the machining thickness of the airbag cover 100 is corrected in step S114. Specifically, in step S113, the airbag-cover receiving surface 131 of the airbag-cover receiver jig 130 is used as a reference plane for copying-teaching. Accordingly, on the assumption that the airbag cover 100 is actually placed on the airbag-cover receiving surface 131 (reference plane), data of a specified thickness of the airbag cover 100 offset from the airbag-cover receiving surface 131 become correction data. Typically, the position where the thickness at the bottom of the groove of the tear line 102 is offset upward from the airbag-cover receiving surface 131 becomes the assumed machining position of the airbag cover 100. The correction data acquired in step S114 is taught (stored) to the controller 330. Step S114 is a step for teaching correction data in which the copying data acquired in step S113 is corrected for the thickness of the airbag cover 100 to the controller 330.

In step S115 in FIG. 16, the drive arm 212 is controlled via the controller 330 according to the correction data obtained in step S114, and the prototype of the airbag cover 100 is actually produced. At that time, the member-to-be-taught 219 used in copying teaching is replaced with the ultrasonic machining blade 216. The prototype of the airbag cover 100 is manufactured in such a manner that an input signal corresponding to the correction data acquired in step S114 is transmitted from the controller 330 to the drive arm 212. Step S115 is a step for manufacturing the prototype of the airbag cover 100 by controlling the drive arm 212 according to the correction data taught in step S114.

In step S116, an actual size of the prototype of the airbag cover 100 acquired in step S115 is measured. Then, in step S117, it is determined from the measurement of the size of the prototype in step S116 whether there is a need for correcting the machining data for the drive arm 212 during machining. When it is determined that the data needs to be corrected (YES in step S117), the data is corrected in step S118, and the procedure returns to step S117. In other words, the correction data stored in the controller 330 in step S114 is updated to the correction data acquired in step S118, and taught to the controller 330 as machining data. In contrast, when it is determined that there is no need to correct the data (NO in step S117), the copying-teaching process is completed and the procedure proceeds to the machining process shown in FIG. 17. In that case, the correction data stored in the controller 330 is not updated to correction data and is taught to the controller 330 as unchanged machining data. Steps S116 to S118 are steps for measuring the size of the prototype of the airbag cover 100 manufactured in step S115 and correcting the correction data to machining data on the basis of the measurement.

[Machining Process]

The machining process is a process for performing actual ultrasonic machining (tear line machining) of the airbag cover 100 according to the machining data acquired in the copying-teaching process (steps S111 to S118).

FIG. 17 is a flowchart showing a machining process in FIG. 15. As shown in FIG. 17, in the machining process, in step S121, the airbag cover 100 is placed on the airbag-cover receiving surface 131 of the airbag-cover receiver jig 130 in FIG. 18. In step S121, the suction mechanism (not shown) of the airbag-cover receiver jig 130 is activated.

In step S122, the set state of the airbag cover 100 is checked, wherein the state of adhesion between the airbag cover 100 and the airbag-cover receiver jig 130 is checked by the suction pressure determined by the suction-pressure detection device (not shown). The displacement of the airbag cover 100 is checked by using the image check camera 223, as in the method described with reference to FIG. 4. Thus, the operator can check the set state of the airbag cover 100.

In step S123, the machining start position (origin) of the ultrasonic machining blade 216 is determined before the machining. In determination, the displacement gauges 221 and 222 are used, as in the method described with reference to FIG. 3. Thus, the machining start position (origin) of the ultrasonic machining blade 216 is determined.

In step S124, actual machining (machining of a tear line) with the ultrasonic machining blade 216 is started. The machining is performed in such a way that an input signal corresponding to the machining data acquired in step S114 or the machining data updated in step S118 is transmitted from the controller 330 to the drive arm 212.

In step S125, the state of machining with the ultrasonic machining blade 216 is checked at (during) the ultrasonic machining with the ultrasonic machining blade 216 in step S124, wherein the height H4 from the back surface 101 of the airbag cover 100 to the displacement gauge 222 is determined by the displacement gauge 222, as in the method described with reference to FIG. 5. Also, the machining locus of the tear line 102 is checked with the image check camera 223, as in the method described with reference to FIG. 6.

In step S126, the machining start position (origin) of the ultrasonic machining blade 216 is checked again by the operation similar to that of step S123.

Finally, in step S127, the acceptability of the ultrasonic machining of the airbag cover 100 is determined. When it is determined that the ultrasonic machining of the airbag cover 100 passes criteria (YES in step S127), the airbag cover 100 is determined to be a conforming item. On the other hand, when it is determined that the ultrasonic machining of the airbag cover 100 fails the criteria (NO in step S127), the airbag cover 100 is determined to be a non-conforming item. Thus, repeating the steps S121 to S127 allows the airbag cover 100 having the tear line 102 formed in the back surface 101 by the ultrasonic machining to be manufactured in large quantities.

The method of ultrasonic machining with the ultrasonic machining unit 300 also offers the advantage of reliably forming the tear line 102 of a desired shape that is torn to open in a desired way in the airbag cover 100, as with the ultrasonic machining unit 200.

Furthermore, the use of the ultrasonic machining unit 300 is effective in reducing the cost of equipment. The data for machining the airbag cover 100 is produced by the copying-teaching process in which the member-to-be-taught 219 copies the airbag-cover receiver jig 130, so that there is no need for a converter for converting data from CAD data to CAM data (NC-operating data) and an NC controller for machining according to CAM data. The embodiment in which machining data is acquired by copying the original product is effective in simplifying the teaching procedure. Once machining data is obtained in the copying-teaching process, then the desired tear line 102 can be formed in the airbag cover 100 by controlling the drive arm 212 according to the machining data, thereby simplifying the process of forming the tear line 102 in the airbag cover and reducing manufacturing cost. Accordingly, the ultrasonic machining unit 300 is particularly effective in manufacturing the airbag cover 100 having the tear line 102 in large quantities.

The disclosure of Japanese Patent Application No. 2004-109085, filed on Apr. 1, 2004, is incorporated in the application.

While the invention has been explained with reference to the specific embodiments of the invention, the explanation is illustrative and the invention is limited only by the appended claims.

What is claimed is:

1. A method of manufacturing an airbag cover for covering an airbag, comprising:
    preparing the airbag cover,
    forming a groove in the airbag cover with an ultrasonic machining device along one direction to form a tear line so that a thickness of a groove formed portion of the cover is varied in a thickness direction and the groove is inclined relative to the thickness direction according to a location of the groove in the airbag cover, and
    machining said groove to have one plane inclined surface inclined along the one direction and extending outwardly from a bottom of the groove, and another plane inclined surface inclined along the one direction to face said one plane inclined surface with a space therebetween and extending outwardly from the bottom of the groove, said one and another plane inclined surfaces being arranged asymmetrically to have different angles relative to the bottom of the groove and formed successively along the tear line.

2. A method of manufacturing an airbag cover according to claim 1, wherein said groove is formed with the ultrasonic machining device so that the thickness of the groove formed portion is varied in the thickness direction according to the location based on a load applied to the groove when the airbag is inflated.

3. A method of manufacturing an airbag cover according to claim 1, wherein said groove has a winding shape in a plan view.

4. A method of manufacturing an airbag cover according to claim 2, wherein said airbag cover is fixed and an ultrasonic machining blade of said ultrasonic machining device is inclined and moved relative to the airbag cover to form the groove.

5. An airbag cover for covering an airbag, comprising:
   a cover body having a backside, and
   a groove formed in the backside and having a thickness smaller than a thickness of the cover body so that a groove formed portion of the cover body at the groove is variable in a thickness direction according to a location thereof, said groove extending in one direction of the back plate to form a tear line and being inclined relative to the thickness direction,
   wherein said groove includes one plane inclined surface inclined along the one direction and extending outwardly from a bottom of the groove, and another plane inclined surface inclined along the one direction to face said one plane inclined surface with a space therebetween and extending outwardly from the bottom of the groove, said one and another plane inclined surfaces being arranged asymmetrically to have different angles relative to the bottom of the groove and formed successively along the tear line.

6. An airbag cover according to claim 5, wherein said groove formed portion is variable in the thickness direction according to a load applied to the groove when the vehicle airbag is inflated.

7. An airbag cover according to claim 5, wherein said groove includes a first groove and a second groove, said first groove having a depth greater than that of the second groove so that the airbag cover is torn to open along the second groove to deploy the vehicle airbag into an occupant protection region after the airbag cover is torn to open along the first groove to lift the airbag cover toward the occupant protection region in case of a vehicle crash.

8. An airbag module comprising:
   an airbag,
   a container for accommodating the airbag,
   a gas supply device for supplying gas to the airbag to inflate the airbag, and
   an airbag cover for covering the airbag, said airbag cover having a groove with a depth smaller than a thickness of the airbag cover and a groove formed portion variable in a thickness direction according to a location based on a load applied when the airbag is inflated, said groove extending in one direction of the airbag cover and having a first groove and a second groove so that the airbag cover is torn to open along the second groove to deploy the vehicle airbag into an occupant protection region after the airbag cover is torn to open along the first groove to lift the airbag cover toward the occupant protection region in case of a vehicle crash,
   wherein said groove includes one plane inclined surface inclined along the one direction and extending outwardly from a bottom of the groove, and another plane inclined surface inclined along the one direction to face said one plane inclined surface with a space therebetween and extending outwardly from the bottom of the groove, said one and another plane inclined surfaces being arranged asymmetrically to have different angles relative to the bottom of the groove and formed successively along the tear line.

9. An airbag module according to claim 8, wherein said first groove has a depth greater than that of the second groove.

10. A method of manufacturing an airbag cover according to claim 2, wherein said ultrasonic machining device is moved relative to the airbag cover in the thickness direction to change the thickness of the groove.

11. A method of manufacturing an airbag cover according to claim 10, wherein the thickness of the groove is continuously changed.

12. An airbag cover according to claim 6, wherein the thickness of the groove formed portion is continuously changed along the one direction.

13. An airbag module according to claim 8, wherein the thickness of the groove formed portion is continuously changed along the one direction.

* * * * *